United States Patent
Cermak

[15] 3,647,480
[45] Mar. 7, 1972

[54] PROCESS FOR PREPARING CONDIMENT-CONTAINING FATTY PARTICULATES

[72] Inventor: Robert E. Cermak, Chicago, Ill.
[73] Assignee: SCM Corporation, Cleveland, Ohio
[22] Filed: Feb. 6, 1969
[21] Appl. No.: 797,236

[52] U.S. Cl. .........................................99/140 R, 99/118 P
[51] Int. Cl. .........................................................A23l 1/26
[58] Field of Search..................99/140, 123, 118 P, 143, 118

[56] References Cited

UNITED STATES PATENTS

| | | | |
|---|---|---|---|
| 2,278,466 | 4/1942 | Musher | 99/123 X |
| 2,785,983 | 3/1957 | McMath | 99/140 |
| 3,476,572 | 11/1969 | Dros et al. | 99/143 |
| 3,261,692 | 7/1966 | Chang et al. | 99/143 X |
| 3,389,000 | 6/1968 | Fujita et al. | 99/143 X |

Primary Examiner—Morris O. Wolk
Assistant Examiner—Warren Bovee
Attorney—Merion H. Douthitt, Harold M. Baum and Howard G. Bruss, Jr.

[57] ABSTRACT

An improvement in a process for preparing a condiment-containing fatty particulate comprises contacting condiment in a zone with preformed fatty matrix particles. The temperature during the contacting operation is sufficiently low and the contact is conducted for a time sufficient for making discrete composite particles of the matrix particles and the condiment without substantial uncontrolled agglomeration of either the matrix or resulting composite particles. The exterior of the fatty matrix particle during the contacting operation, usually a physically blending, advantageously is softened or slightly plasticized. The fatty matrix particle can act to substantially enrobe or to sorb the condiment. The resulting discrete particles can be substantially simultaneously formed or postformed into agglomerates of predetermined size or size range by uniting a plurality of the discrete composite particles. Both the discrete composite particles and their agglomerates are useful in the production of foodstuffs such as cakes, doughnuts, rolls, bread, coffee cake, frosting mixes, whipped toppings, and the like.

7 Claims, No Drawings

PROCESS FOR PREPARING CONDIMENT-CONTAINING FATTY PARTICULATES

Heretofore, the processes for producing a fatty product containing condiment have been of several types. One process contemplates dispersing the condiment, e.g., pepper, cinnamon, flavoring oils, etc., in molten fat and spray chilling the resultant dispersion. A substantially homogeneous beaded product is obtained. Another process contemplates solidifying a dispersion of condiment in molten fatty substance, then grinding or chipping the substantially homogeneous solidified material for forming flavored chips or granules. Still another way is to emulsify the fat or fatty material in a blend with other materials, then spray dry the emulsion to generate the particles whereby the cross section is generally substantially nonhomogeneous.

Advantages of this invention over prior practice include: the ability to substantially completely enrobe or sorb the condiment material when necessary or desirable without exposure of the condiment to the often undesirably high temperatures of molten fatty core substances, for example avoidance of temperatures as high as 130° F. or higher whereby certain condiments or fatty substances can be damaged; process flexibility for producing small customized runs of a variety of products with low expense to change from product to product; and a modest equipment investment for producing such products.

When the condiment is substantially fully enrobed by, or sorbed into, the fatty matrix particle, there results a measure of protection of the condiment against deterioration caused by exposure to the atmosphere, protection for intermediate actions in foodstuff against possible inhibiting action of the condiment (e.g., yeast inhibition by cinnamon or like spices), and a controlled release of the condiment into the foodstuff with which it is compounded when the matrix particle melts during the foodstuff processing.

Broadly, one aspect of the invention is an improvement in a process for producing fatty particles containing condiment. Another aspect is a discrete particulate product resulting from such improved process. Still another way is a process for inducing agglomeration of such particulates, and yet another is the resulting agglomerate produced by such process.

The improvement in process comprises contacting condiment in a zone with preformed fatty matrix particles at a temperature and for a time sufficient for making discrete composite particles of said matrix particles and said condiment with a substantially continuous fatty matrix phase at the surface of said composite particle without substantial uncontrolled agglomeration of either the matrix particles or the discrete particles, the temperature of the matrix particles and composite particles in the zone being their bulk temperature and this temperature being not substantially above the Wiley Melting Point of the matrix particles, the holding time in the sorbing zone being an average holding time and being at least about a second. The resulting discrete particles can be formed simultaneously or postformed into agglomerates of predetermined size or size range by uniting a plurality of the composite particles. Both the discrete composite particles and their agglomerates can be used in the production of foodstuffs such as cakes, doughnuts, rolls, bread, coffeecake, frosting mixes, whipped toppings, and the like.

The condiment, for purposes of this invention, can be a liquid, vapor, or solid phase seasoning ingredient suitable for producing or enhancing a flavor and/or color in edible products. It includes single or mixed pungent or spicy solids, flavoring oils, essences, oleoresins, extracts and other zesty flavorings, for example oleoresin of ginger, oils or extracts or solid forms of sage, pimenta, coriander, parsley, caraway, nutmeg, cardamon, cloves, celery, etc.

The condiment, for purposes of this invention, also can include or consist of: edible titanium dioxide in permissible amounts, especially that treated with edible fatty acid, fatty alcohol, or the like, according to the precepts of copending, commonly assigned U.S. Pat. applications having Ser. Nos. 723,900, 723,902, 723,901, 723,921, and 723,920, all filed on Apr. 24, 1968; monosodium glutamate; food emulsifiers or blends thereof such as mixtures of partial glycerides of edible fatty acids, distilled monoglycerides of edible fatty acids, lecithin, hydroxylated lecithin, glycol esters of edible fatty acids such as propylene glycol monostearate, polyglycerol esters of fatty acids, fatty acyl lactylic acids and their salts, such as calcium stearyl lactylic acid, fatty acid esters of fumaric or citric acid, sorbitol or sorbitan esters of fatty acids, optionally oxyethylated, etc.; edible fatty acids such as stearic, palmitic or behenic; edible fatty alcohols such as stearyl or cetyl; edible triglyceride fats such as tristearic, tripalmitic, palmitodistearin, hydrocottonseed, hydrosoybean, tallow, and the like; provided, however, that the composition of such food emulsifier, fat, fatty acid, or fatty alcohol is different from that of the fatty matrix particle for generating a nonhomogeneous (in cross section) resulting particle; edible gums, stabilizers, etc., such as gelatin, soy protein, sodium carboxymethyl cellulose, edible "crystalline" cellulose, hydroxy-propyl cellulose, cornstarch, wheat flour and the like; and mixtures of the same in solid phase, liquid phase, pastry mixture, or dissolved or suspended in a liquid (which can be fugitive at room temperature or substantially residual).

The condiment or condiment mixture can be appended to the matrix particle (as a core) to yield a nonhomogeneous resulting particle having a desired surface effect or combination of effects for culinary, organoleptic, or esthetic purposes such as baking, thickening, coloring, flavoring, aromatizing, and/or dispersing in a foodstuff. In other operations, the condiment or condiment mixture is enrobed by the matrix material. Where the condiment is a solid on or near the surface, its concentration is a discontinuous phase interspersed in a fatty phase. Where, however, the condiment is a fatty material such an an emulsifier, it can form, in some cases, a substantially continuous phase about the matrix.

By a fatty matrix particle is meant an ostensibly solid (nonsticky to and not readily deformed by touch at room temperature of 75° F.) small particle of fatty material such as one of a triglyceride fat, fatty acid, fatty emulsifier or surface active agent, fatty alcohol, wax such as beeswax or paraffin, or a mixture of same, suitably of edible quality for culinary or cosmetic purposes and capable of being preformed into small matrix particles which remain substantially discrete from each other and readily pourable at room temperature (75° F.) from a conventional 100 ml. beaker which has been loosely filled at such temperature with the matrix particles in uncompressed bulk condition.

The fatty matrix particle can be preformed into the shape of a bead, flake, a chip, a cut or multifaceted form, a granule, and irregular solid particle, or the like. It can be colored and/or flavored or otherwise compounded conventionally, substantially homogeneously, if desired or necessary. Fundamentally, the composition of the matrix particle should be of a composition distinguishable from the condiment composition applied to it, enrobed by it, or sorbed into it.

Materials which can be included as a fraction (ordinarily a minor fraction) of the fatty matrix particle include emulsifying materials such as those shown hereinabove, fungistats, bacteriastats, silicone oil, tints, dyes, colorants, flavorants, odorants, and antioxidants. When incorporating such materials into the matrix particle, they are generally proportioned in useful ratios for their end purposes. Thus, for example, one can use in a typical formulation 0.1 to 30 percent (by weight of the matrix particle) of conventional emulsifiers and stabilizers; colorants are useful in about the same proportion to yield the desired color in the resulting particle or in the end product to which it is to be added.

For broad utility, the matrix particle advantageously is a fat. The fat can be any neutral edible triglyceride or mixture of triglycerides such as one having a Wiley Melting Point below about 200° F., preferably below about 165° F., and generally at least about 100° F., preferably at least about 120° F. A fatty core particle such as fat in straight or compounded form should have a melting point sufficiently high so that conventionally made beads thereof (from a spray chilling operation and passing a sieve from about 30 mesh and retained on a 60 mesh U.S. standard sieve) will be substantially resistant to uncontrolled agglomeration (not over 25 percent of its weight agglomerated into multiparticle aggregates) when standing at 85° F. in unpacked, loosely loaded condition in a conventional 100 ml. beaker. This can be termed a fatty matrix particle of minimum hardness for our purposes.

Vegetable fats (including nut fats) and animal fats or mixed vegetable and animal fats, generally hydrogenated and often rearranged, are suitable for making the matrix particle. Typical vegetable oils which can be hydrogenated for this purpose are cottonseed, corn, peanut, soybean, palm kernel, babassu, olive, and safflower; various useful animal fats include hydrogenated and unhydrogenated fats or fat fractions derived from hogs, cattle, and sheep including lard, oleostock, oleo-stearin, and tallow. Among the most desirable fats here are the so-called "confectioners' hard butters" because of their desirable mouthing characteristics.

By a "hard butter" is meant a broad class of tri-glycerides having physical properties and performance properties permitting their use in confectioners' coatings as a replacement for cocoa butter. Suitable hard butters should have a Wiley Melting Point between about 90° F. and about 120° F., and should diminish fairly sharply in their ratio of solid to liquid fraction at a temperature of about 75° F. or higher, preferably at about mouth temperature. An example of especially useful hard butter is one derived from hydrogenated palm kernel oil.

Fats or fat-containing mixtures used as a matrix material should be substantially hard. We have found that quite desirable fats have a high (at least about 50 percent) total solids content at room temperature (75° F.) Fats which are unduly plastic at this temperature can form uncontrolled and, therefore, undesirable agglomerates on blending or in storage. A preferred fatty matrix particle has a Solid Fat Index of 75–82 percent total solids at 80° F., 70–76 percent total solids at 92° F., and 58–64 percent total solids at 100° F. Such fat in conventionally beaded condition is not unduly plastic at room temperature and fuse or otherwise form a substantial fraction of uncontrolled and undesirable agglomerates. The Solid Fat Index is the test as described in the Official and Tentative Methods of the American Oil Chemist's Society coded CD 10–57, corrected in 1961.

To resist rancidity of the resulting condiment-containing particulate, we prefer to use a fat (and any added plasticizing oil which remains as a residue on or in the fatty matrix) having an AOM stability of at least 100 hours. AOM stability stands for the active oxygen method described in the Official and Tentative Methods of the American Oil Chemist's Society, CD 1257, revised 1959. The matrix particle and/or plasticizing oil can, of course, have antioxidants (BHT, BHA, etc.) butylated hydroxytoluene and butylated hydroxyanisole included in it in amounts for assisting to resist rancidity.

It is often desirable to select fatty matrix particles by their Wiley Melting Points, especially when the product is to be used in producing baked goods. Advantageously the fatty substance of the matrix has a Wiley Melting Point of at least about 100° F. and preferably of at least about 120° F. to 130° F.

By judicious selection of such melting point, the temperature for release of the condiment in or on the baked goods can be regulated. For example a condiment having fungistatic or fungicidal action is sorbed into or enrobed by a fatty matrix having a high melting point; it can be made to delay its release from the matrix during a dough-processing cycle until after useful action of yeast for proofing or the like has taken place, typically at a temperature lower than such melting point.

The weight ratio of condiment to fatty matrix can be regulated within reasonably broad limits to produce the culinary, aesthetic, organoleptic and/or handling effect or property desired in the final product. In instances where relatively little fatty matrix is necessary or desirable in the finished particulate, one can use as much as about 65 to 75 percent condiment by weight of such resulting product. At the other end of the scale the portion of condiment can be 5 percent by weight or substantially less. The amount of condiment incorporated is dependent to a large extent on the strength of the condiment for its desired effect. A mild one has little organoleptic effect when used at a proportion of substantially less than about 5 percent by weight of the resulting product. A potent one such as one containing oil of capsicum can be useful in proportions even as low as a fraction of 1 percent, e.g., 0.01 percent.

The matrix particle surface often is desirably plasticized for use in this process. Suitably this can be done by adding an edible oil or solvent to the solids in process, such oil or solvent being liquid at room temperature, residual and edible or substantially fugitive or standing in the open at room temperature for 10 days or less, and fat soluble. A typically useful plasticizing oil is a fat of vegetable or animal origin, optionally partially hydrogenated, and derived suitably from oils such as soybean, peanut, corn, sesame, olive, cottonseed, coconut, palm kernel, safflower, or a mixture of same. Preferred oils of high stability (oxidation resistance) are partially hydrogenated and rearranged, then recovered as a selected fraction by solvent fractionation of the resulting mixture. Other plasticizing ingredients include similarly liquid phase fatty emulsifiers or solutions of same as partial glycerides, polyglycerol esters, etc., and various oily edible mixtures or even substantially fugitive (on standing or mild heating) such as lower molecular weight, normally liquid phase ketones, aldehydes, esters, alcohols, or the like. These rarely need to be added to the operation in a proportion greater than about 10 percent by weight of the fatty core particles and generally are used at about 0.05 to 2 percent.

In practicing the invention, the matrix particle is preformed prior to its blending with the condiment or condiment mixture. Preferably for efficiency and economy, the preforming operation is accomplished by spray chilling the molten fatty substance or mixture to form a bead. Other useful preforming methods include for example: extruding through a warm die and cutting off the extruded sections into small pieces, then cooling; comminuting by grinding or chipping a solid, optionally then classifying the resulting comminuted material; flaking from a chilled roll; and forming a ribbon by a chilled roll and slicing the ribbon into flakes. A beaded matrix is substantially spherical. However, the shape is not critical and the matrix particle can be in the form of a diamond, hexagon, an irregular chip or granule, a square, etc., any or all with full or open centers. Generally, the advantageous size of the beaded matrix particle is such that it will pass a 5 mesh and be retained on an 80 mesh (U.S. standard) sieve, and preferably the effective size range is between about 30 and about 60 mesh. Flakes or granules ordinarily are no larger than about three-eighth inch in their largest dimension, but can be made larger or smaller if necessary or desirable.

Generally and preferably we form the condiment-containing particulate by intimately contacting the condiment with the preformed fatty matrix particles at a temperature below the Wiley Melting Point of such matrix particles for efficiency and economy. If a plurality of matrix particles of different Wiley Melting Points are used, then the lowest of such melting points is the limiting one on the preferred contacting operation. A solid phase condiment, when in extremely finely divided form (all passing a 150 mesh U.S. standard sieve, typically with at least about 95 percent by weight being retained on the 325 mesh screen), yields a discrete composite particle with the condiment sorbed into or onto the matrix particle. We can also use a coarse particulate product (between 16 and 20 mesh, U.S. standard sieve), and when intimately contacted with smaller plasticized matrix particles, yields a discrete composite particle with the fat enrobed about the condiment.

The matrix particle and condiment mixture can be efficiently contacted by blending in conventional blending equipment. Equipment suitable for blending liquid phase or solid phase condiment with the matrix particle includes: ribbon blenders or mixers, tumbling barrels, double cone mixers, mushroom mixers, and pan mixers. For efficiency and economy of operation and cleaning, we prefer to use a double-motion paddle mixer (bakers type). Vapor phase or entrained liquid phase droplets or fog of condiment can be blended with the matrix particles by fluidized or moving bed techniques, for example where the matrix particles make up the bed and the condiment is carried upwardly therethrough in a noncondensible gas stream such as air or nitrogen, which can be recirculated. Blending times of at least a second, advantageously at least a minute, and preferably 5-15 minutes, are used to promote efficient union of the feeds and obtention of the desired particles.

A typical contacting or blending operation is done at about room temperature for efficiency and economy. However, the contacting operation can be conducted at substantially lower temperatures or even at somewhat higher temperatures for a limited time where necessary or desirable so long as formation of discrete composite particles occurs without substantial uncontrolled agglomeration (about a maximum of 25 percent of the mass by weight) of the matrix particles or resulting particles one to another. Agglomeration is suppressed by contacting the matrix particles and condiment particles in a sorption zone at a bulk temperature not exceeding the Wiley Melting Point of the matrix particles and an average holding time of at least about a second. The bulk temperature is measured by grabbing at random a sample from the contacting zone and measuring its highest temperature with an ordinary glass laboratory thermometer. If the contacting operation is batch, the average holding time will be the mixing time. If the operation is continuous, it is the quotient of the bulk volume of particles in the contacting zone divided by the volumetric feed rate of the matrix particles and other solid feed particles.

We can also produce in such sorption zone controlled agglomeration of the small particles of resulting composite product. Agglomerates are quite desirable for some uses. Thus, by careful and judicious elevation of the temperature coupled with the intensive mixing, controlled agglomeration yielding agglomerates of a predetermined size or size range can be done. The mixture, then, can be classified as to size and the undersized returned to the agglomerating operation. However because of the delicacy of control and frequently structural weakness of such agglomerate, we prefer to use other methods. The agglomerate can appear to be a cluster of particles joined together like a rasberry, or it can appear to be in a lump like a coin or an annulus. An example where an agglomerate is preferred over a smaller composite particle is in the instance where sensational gross "hot spots" of flavor concentration are desired in a baked product such as a biscuit, or where significant surface of internal color concentrations are desired in the product. Agglomerates containing food colorant are useful when scattered to produce a gross speckled effect, whereas the smaller discrete particulate product produces slight color centers of the same or varigated colors which are less conspicuous, but can be dispersed more widely. A baked product where conspicuous color spots might be desired is a pizza surface. By forming the agglomerate into a selected shape, for example a Roman capital letter D, an O-ring, a trademark shape, or the like, it is easy to customize the agglomerate for selective markets. When these agglomerates are used, for example in producing cooked or baked goods, special agglomerates desirably shaped can be made to appear as a fossillike imprint in or on the product when the fatty matrix material dissipates.

The agglomerate can be made from the same kind of condiment-containing composite particles or a mixture of different sorts of such particles to obtain a combined organo-leptic effect, a foreshortened or a protracted melting range, a monochromatic or polychromatic coloring effect, or the like.

Advantageously the agglomerates are produced in a postforming operation (after the contacting operation) by uniting a plurality of the smaller particulates containing the condiment into an interlocked or "sintered mass" suitable for handling by operations utilizing pressure, heat, and/or an edible or innocuous binding agent. Such binding agent can be substantially fugitive, residual, adhesive, even a simple fatty bead or paste which causes a group of the discrete composite particles to adhere to one another in a briquetting, pelletizing, tableting or coining operation. In such operations, a quantity of the composite particles can be compressed in a mold, extruded from a die and cut into sections, optionally with additional postforming of the molded or cutoff sections to a desired shape.

In one form of pelletizing, the material is pressed through a perforated die and the resulting extruded material is cut transversely to its flow direction into a plurality of small pellets as the flow emerges from the die. Edible binders such as wheat flour paste, plain fatty particles or plastic fats, edible gums, gelling solutions such as aqueous gelatin, etc., and even fugitive normally liquid phase solvents such as lower molecular weight ketones, esters, aldehydes, and alcohols, e.g., acetone or ethanol, or even water in some cases can be used where necessary or desirable in minor and usually very minute effective proportions for uniting a plurality of the finer particulates or the small particulates can be joined by rolling or tumbling together.

For best control of the agglomerating operation, it is done separately from the contacting operation. For efficiency and economy, we prefer to agglomerate by the use of a briquetting, tableting, or pelletizing technique without any additive, or with such additive in a very restricted amount so as to reduce or eliminate an aftertreating operation such as drying or substantial chilling.

The temperature of the agglomeration operation is generally restricted to that well below the temperature at which the fatty matrix particle will melt and run, e.g., the Wiley Melting Point, although somewhat higher temperatures than the Wiley Melting Point (10° to 15° F.) can be used for short periods of time for achieving a sinteringlike effect. However particularly where the condiment can stand the temperature, complete fusion or melting and subsequent rehardening of the fatty matrix material within a particular agglomerate structure during an agglomeration operation is permissible.

The product produced from the agglomerating action can be of any convenient and useful size for handling and/or for the effect desired with the end product. Generally such agglomerate is no larger than about an inch in its largest dimension.

When producing either the small particulate form or the agglomerate form, we can and often do dust with or otherwise apply to the surface of the final product a flow-promoting agent such as an efflorescent salt to enhance the free-flowing properties of the product. Certain products such as those containing a high proportion of table salt have improved flow and dispersibility into most cooking ingredients when so treated. Typical flow-promoting agents include magnesium phosphate, tricalcium phosphate, sodium aluminum silicate, fine particle silica, and calcium carbonate, all generally in extremely finely divided condition.

The following examples illustrate preferred embodiments of the invention, but should not be construed as limiting it. In this application all parts are parts by weight, all percentages are weight percentages, and all temperatures are in degrees Fahrenheit unless otherwise specified.

example 1

A salt-containing fatty particulate is prepared as follows: 35 parts beaded hard butter particles, 64.8 parts salt (NaCl) and 0.2 part of a plasticizing fat-soluble edible oil are blended in a conventional double-motion paddle mixer (bakers' type) at room temperature (75° F.) and at atmospheric pressure for about 10 minutes. The beaded hard butter particles are preformed by spray chilling molten fat to a particle size of between about 30 to 60 mesh (U.S. standard sieve). The hard butter has a Wiley Melting Point of 120°-121° F., a Solid Fat Index of 58-64 percent total solids at 100° F., 70-76 percent total solids at 92° F., and 75-82 percent total solids at 80° F. The salt is coarse salt having a particle size of about 16 to 20 mesh (U.S. standard sieve). The plasticizing oil is made from refined and rearranged domestic vegetable oils, namely soybean and cottonseed, has a Wiley Melting Point of 63° F. ∓4° F., an Iodine Value between 74 and 81, and a Solid Fat Index of 3 percent total solids at 70° F. The plasticizing oil and heat generated in the sorption zone of the mixer by agitation softens the beaded hard butter matrix particulates to allow the fat to flow around and enrobe the salt particles. The temperature holding time, speed of mixing, and proportion of plasticizing oil used interact and can be controlled to suppress the formation of large agglomerates in the sorption zone; until virtually nil. Discrete composite particles comprising the salt and hard butter are produced in about 10 minutes. About 1 percent ultrafine powdered silicon dioxide then is blended with the discrete product for a few minutes to render the product substantially free flowing. The resulting discrete particles are beads, the vast preponderance of which are between about 10–20 mesh (U.S. standard sieve).

EXAMPLE 2

A discrete composite salt-containing fatty particulate is formed wherein salt is sorbed onto and into the beaded hard butter matrix when finely divided salt (between 150–350 mesh, U.S. standard sieve) is blended with the beaded hard butter of Example 1 and in the manner described in Example 1, except that half the proportion of plasticizing oil is used.

EXAMPLE 3

A cinnamon-containing fatty particulate is produced by blending in the mixer of Example 1 at 70° F. and at atmospheric pressure 74.8 parts of beaded hard butter and 0.1 part of cinnamon oil for one minute, then adding 25 parts of very finely divided cinnamon powder and continuing to blend for 9 minutes. The beaded hard butter is the same as that described in Example 1.

On blending, the finely divided cinnamon is sorbed into the matrix of hard butter, forming a discrete composite particle of cinnamon and hard butter.

These discrete cinnamon-containing fatty particles then are postformed into an agglomerate. The agglomerate is formed by feeding a plurality of the discrete particles into a warm die which is in the form of a Roman capital letter D. The particles are compressed and, on release from the die, cohere in the shape of the letter.

A dry mix for coffee cake is prepared, basis weight of flour, by blending 100 percent flour, 10 percent sugar, 2 percent salt, and 4 percent nonfat dry milk powder. Wet ingredients blended in subsequently are 4 percent yeast, 6 percent whole eggs, 66 percent water and 6 percent plastic shortening. The resulting dough is scaled into one ounce buns for baking. Prior to baking about 25–30 of the agglomerates are sprinkled onto the surface of the assembled buns. They then are placed in an oven and baked conventionally. The resulting coffeecake buns contain dark, fossillike imprints of the letter on the surface.

Having thus described the invention, what is claimed is:

1. In a process for preparing a condiment-containing fatty particulate, the improvement which comprises: contacting condiment in a zone with preformed fatty matrix particles at a temperature and for a time sufficient for making discrete composite particles of said matrix particles and said condiment with a substantially continuous fatty matrix phase at the surface of said composite particle and without substantial uncontrolled agglomeration of either said matrix particles or the resulting composite particles, the temperature of said matrix particles and said composite particles in said zone being their bulk temperature and being not substantially above the Wiley Melting Point of said matrix particles, the holding time in said zone being in average holding time and being at least a second.

2. The process of claim 1 wherein the surface of said matrix particles is plasticized prior to or during said contacting operation.

3. The process of claim 1 wherein said condiment is in ostensibly solid phase and said contacting is done by physically blending the condiment with the matrix particles for at least about a minute.

4. The process of claim 1 wherein the matrix particles comprise an edible fat.

5. The process of claim 1 wherein the matrix particles are preformed by spray chilling, the condiment comprises sodium chloride, and the resulting composite particles are treated with a flow-promoting agent.

6. The process of claim 1 wherein a plurality of said resulting composite particles are united together as agglomerates of predetermined size in said sorbing zone substantially simultaneously with the contacting operation 7. The process of claim 1 wherein an agglomeration of the resulting composite particles is performed as a step subsequent to said contacting operation.

* * * * *